(12) United States Patent
Okita

(10) Patent No.: US 7,406,037 B2
(45) Date of Patent: Jul. 29, 2008

(54) PACKET FORWARDING APPARATUS WITH REDUNDANT ROUTING MODULE

(75) Inventor: Hideki Okita, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 627 days.

(21) Appl. No.: 11/045,427

(22) Filed: Jan. 31, 2005

(65) Prior Publication Data

US 2005/0226144 A1    Oct. 13, 2005

(30) Foreign Application Priority Data

Apr. 8, 2004    (JP) .............................. 2004-113986

(51) Int. Cl.
*H04L 12/26* (2006.01)
(52) U.S. Cl. ...................................... 370/218; 370/389
(58) Field of Classification Search ................. 370/218, 370/219, 221
See application file for complete search history.

(56) References Cited

U.S. PATENT DOCUMENTS

| 2002/0060986 A1* | 5/2002 | Fukushima et al. | 370/218 |
| 2003/0043737 A1* | 3/2003 | Tada | 370/218 |
| 2003/0056138 A1* | 3/2003 | Ren | 714/4 |

FOREIGN PATENT DOCUMENTS

| JP | 11-154979 | 11/1997 |
| JP | 11-355392 | 6/1998 |
| JP | 2002-084313 | 9/2000 |

OTHER PUBLICATIONS

Chris Gunner, "Reliable Routing for the Internet", IEEE HPSR, May 27, 2002, 16 pages.
"High-Speed, Large Capacity, Highly Reliable IP Switching Node" GeoStream R900 Series, Product Report vol. 1 (High Reliability Version) Nov. 2001, pp. 1-18, and partial English translation, 9 pages.

* cited by examiner

*Primary Examiner*—Charles D. Garber
*Assistant Examiner*—Matthew Campbell
(74) *Attorney, Agent, or Firm*—Reed Smith LLP; Stanley P. Fisher, Esq.; Juan Carlos A. Marquez, Esq.

(57) ABSTRACT

A packet forwarding apparatus wherein a routing control packet received from a network is forwarded to both active and standby routing modules, the standby routing module executes predetermined routing control information processing and sends identification information of the routing control packet to the active routing module, the active routing module executes predetermined routing control information processing, returns a response packet to a sender of the routing control packet, and determines a state of the standby routing module depending on whether an internal control packet has been received from the standby routing module and its contents.

9 Claims, 13 Drawing Sheets

INTERFACE MODULE 10

FIG.7

PACKET TYPE TABLE 14

| TRANSPORT PROTOCOL | PROTOCOL/ PORT NUMBER | PROTOCOL TYPE | VALIDITY | |
|---|---|---|---|---|
| UDP | 520 | RIP | 1 | 140-1 |
| TCP | 179 | BGP | 0 | 140-2 |
| IP | 89 | OSPF | 0 | 140-3 |
| ⋮ | ⋮ | ⋮ | ⋮ | ⋮ |

141, 142, 143, 144

ROUTING MODULE 30

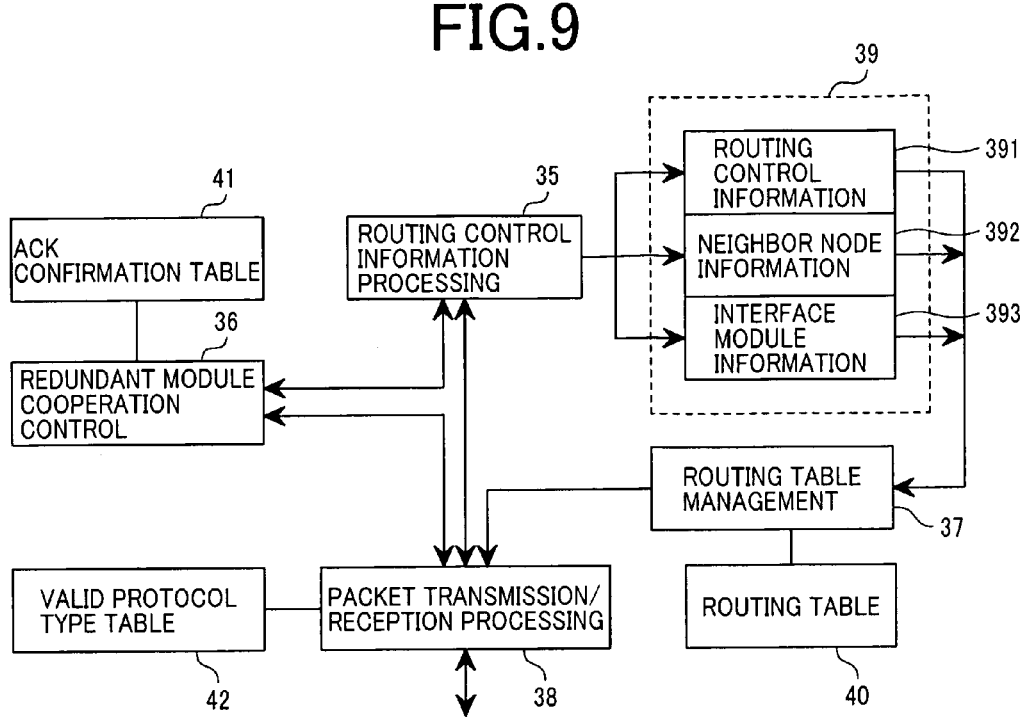

VPN DISCRIMINATION TABLE 28

| VPN DISCRIMINATION CONDITION | VPN IDENTIFIER |
|---|---|
| Port=1~4 & VLAN Tag=1 | 81 |
| ⋮ | ⋮ |

INTERFACE MODULE 10

PACKET FORWARDING APPARATUS WITH REDUNDANT ROUTING MODULE

CLAIM OF PRIORITY

The present application claims priority from Japanese application serial No. 2004-113986 filed on Apr. 8, 2004, the content of which is hereby incorporated by reference into this application.

BACKGROUND OF THE INVENTION (1) Field of the Invention

The present invention relates to packet forwarding apparatus and, more particularly, to a packet forwarding apparatus equipped with redundant routing control information processing modules capable of switching their operation modes.

(2) Description of the Related Art

In recent years, as the Internet has come into popular use while fields of application of IP networks have expanded, high reliability is required for IP networks provided by carriers. On IP switching nodes (routers) that forward packets carried over one line onto another line at connection points on the Internet, a huge amount of routing information covering several tens of thousands of routes across the Internet is retained. Each router exchanges routing control packets with the other routers on a network, using a specific routing protocol, and updates the routing information retained on it. Each router is required to have a function of forwarding packets at a high speed and its data throughput is reaching into terabits per second.

Therefore, when a failure occurs in a packet forwarding processor of one router, quite a huge amount of communication data will be lost per unit time. In the case where a failure should occur in a routing controller of a router, packet forwarding onto an incorrect route might take place until a new alternative route is set up on the network by a function of the routing protocol used. For these reasons, an IP router adopting a redundant system configuration is proposed. This type of IP router is equipped with multiple routing protocol processing modules which are generally called routing modules, one of which operates as active one with the remaining being standby. The standby routing module is activated upon a failure of the active routing module to take over the routing protocol processing. Such a configuration having redundant routing protocol processing modules can significantly reduce the time from the failure occurrence to recover, as compared with a configuration where the failed module is manually replaced by a new module.

According to the redundant system configuration in which the standby routing module is activated upon the failure of the active routing module, however, a considerable time is taken before the recovery to the normal state of the routing control function because the module that has become active by operation mode switching has to collect routing control information from other routers, existing in its vicinity and operating with the same routing protocol, and reconfigure a new routing table.

To solve the above problem, for instance, Fujitsu, Ltd. proposed an IP switching node in which multiple redundant routing modules (hereinafter referred to as routing control modules) are always operating and the routing control information held by a standby routing control module keeps consistent with that information held by an active routing module, as described in a Fujitsu publication entitled "GeoStream R900 Series Product Report Vol. 1 (High Reliability Part)" ([online], November, 2001, Internet, URL:http://telecom. fujitsu.com/jp/products/report/geostream_r900/ report_r900.pdf (Non-patent document 1).

According to the above prior art system, upon occurring a failure in the active routing control module, the standby routing control module can start operation as the active one because it is already activated. In this case, since the standby routing module is already run and has a database of routing control information prepared already, it can take over the routing protocol processing, in principle, without collecting routing control information from other node apparatuses. For the packet forwarding apparatus described in Non-patent document 1, routing control information that is held by the standby routing control module is updated in different ways according to types of routing protocols, as will be described below.

In the case of a Routing Information Protocol (RIP) which is a distance vector type routing protocol, routing control information received from another node apparatus on the network is notified to both the active and standby routing control modules and each module reconfigures or updates its routing information database independently of each other.

In the case of an Open Shortest Path First (OSPF) which is a link state type routing protocol, routing control information received from another node apparatus is notified to the active routing control module and the database information reconfigured on the active routing module is reflected (copied) to the database on the standby routing module by communication between the active and standby routing modules.

In the case of a Border Gateway Protocol (BGP) which is a path vector type routing protocol, the active and standby routing control modules respectively set up separate TCP connections to a peer router and both modules receive routing control information from the peer router and reconfigure or update their routing information databases independently of each other.

Therefore, for the packet forwarding apparatus described in non-patent document 1, if the applied routing protocol is OSPF, routing information updated on the active routing module has to be copied to the standby routing module. This increases the amount of data to be communicated between the modules and each of routing control modules is required to have a high-speed information processing function.

For the above apparatus, if the applied protocol is OSPF or BGP, both the active and standby routing modules update their own routing information databases, but information about the database update state is not communicated between these modules. In the above prior art, the active routing module periodically monitors the standby routing module to prevent an unsuccessful failover in case of the standby routing module malfunction. However, in the case of OSPF or BGP, it cannot be guaranteed that the routing information databases on the active and standby routing modules are actually consistent with each other.

SUMMARY OF THE INVENTION

It is an object of the present invention to provide a packet forwarding apparatus in which updates of routing control information on a standby routing control module are guaranteed independent of the applied routing protocol type and, upon the failure of an active routing control module, processing of routing control information can be continued seamlessly by the standby routing module.

It is another object of the present invention to provide a packet forwarding apparatus capable of keeping routing control information on the standby routing module consistent with that on the active routing module without requiring each routing control module to have excessive processing performance.

To achieve the foregoing objects, a packet forwarding apparatus of the present invention comprises a plurality of interface modules, each of which is connected to input and output lines of a network; at least two routing modules capable of switching their operation modes between active and standby modes, one of which operates as an active routing module, while the remaining operating as standby; and an internal switching unit for exchanging packets among the interface modules and the routing modules, wherein each of the interface modules has means for forwarding a routing control packet received from the network to both the active and standby routing modules, the routing module operating as standby has means for executing routing control information processing in accordance with a specific routing protocol in response to receiving the routing control packet and means for sending an internal control packet including identification information of the routing control packet to the active routing module, and the routing module operating as active has means for executing routing control information processing in accordance with the specific routing protocol in response to receiving the routing control packet and transmitting a response packet to the sender of the routing control packet and means for determining the state of the standby routing module depending on whether the internal control packet has been received or not and its contents.

Distribution of routing control packets to the active routing module and the standby routing module may be performed such a way that a routing control packet received by each interface module is forwarded to a third module other than the routing modules, e.g., a node controller, and the node controller forwards the received routing control packet to the active routing module and the standby routing module. As the identification information of the routing control packet, for example, a sequence number that each of interface modules adds to a routing control packet may be used.

More specifically, one feature of the present invention resides in that each of the routing modules is provided with a table for storing operation mode and the identification information of the latest routing control packet in association with the identifiers of the routing modules connected to the internal switching unit, and that, each time receiving a routing control packet, the routing module operating as active stores the identification information of the routing control packet into the above table and determines the state of the standby routing module depending on whether the internal control packet has been received from the standby routing module within a predetermined time period after receiving the control packet and the relation between the identification information of the routing control information specified in the internal control packet received and the identification information of the latest routing control packet that the active routing module received.

In an embodiment of the present invention, the routing module operating as active has means for sending a response packet to the sender of the internal control packet in response to receiving the internal control packet, and the routing module operating as standby is provided with means for switching its operation mode to active and the active routing module to standby when it has failed to receive the response packet from the active routing module within a predetermined time period after sending the internal control packet.

In another feature of the present invention, the routing module operating as active has means for executing routing control information processing in accordance with the specific routing protocol and transmitting a routing control packet to another node apparatus on the network upon occurrence of a predefined event and means for sending an internal control packet including independent control information applied to the routing control packet to the standby routing module, and the routing module operating as standby has means for executing routing control information processing in accordance with the routing protocol upon occurrence of a predefined event and means for replacing independent control information generated by itself with the independent control information specified in the internal control packet received from the active routing module, thereby to process, when receiving a response packet from another node apparatus on the network, the response packet by applying the independent control information replaced.

In an embodiment of the present invention, the routing module operating as standby has means for switching its operation mode to active and the active routing module to standby when it has failed to receive the internal control packet including the independent control information from the active routing module within a predetermined time period after executing the routing control information processing in accordance with the protocol upon occurrence of a predefined event.

In still another feature of the present invention, one of the routing modules includes a plurality of routing control processing routines to be executed by a processor and constitutes at least two redundant virtual routing control entities by associating each of the routing control processing routines with a routing control routine to be executed by a processor on another routing module, each of the interface module has means for adding to a routing control packet received from the network an identifier of a virtual network to which the routing control packet belongs, and each of the routing modules executes routing control information processing in response to receiving the routing control packet according to a routing control processing routine which constitutes the virtual routing control entity corresponding to the virtual network identifier.

According to the present invention, since the standby routing module sends an internal control packet indicating identification information of the routing control packet that has triggered routing control information processing to the active routing module, the active routing module can determine the operation state of the standby routing module depending on whether the internal control packet has been received or not. According to the identification information of the routing control packet specified in the internal control packet, the active routing module can determine whether the routing control information processing being executed on the standby routing module is synchronous with that executed on the active routing module.

Furthermore, according to the present invention, when the active routing module executes routing control information processing and transmits a routing control packet to another node apparatus on the network upon occurrence of a predefined event, the active routing module sends to the standby routing module an internal control packet including independent control information applied to the routing control packet. Thus, even if the active routing module and standby routing module generate different values of the independent control information, the standby routing module can properly process the response packet from another node apparatus by applying the independent control information specified in the internal control packet.

BRIEF DESCRIPTION OF THE DRAWINGS

FIG. 7 shows an example of a packet type table held by each of interface modules;

FIG. 9 is a functional block diagram showing mutual relationships of software, database, and tables provided in each of the routing modules;

FIG. 10 shows an example of an ACK confirmation table provided in each of the routing modules;

DETAILED DESCRIPTION OF THE PREFERRED EMBODIMENTS

Embodiments of the packet forwarding apparatus according to the present invention will be described hereinafter with reference to the drawings.

Figure 1:
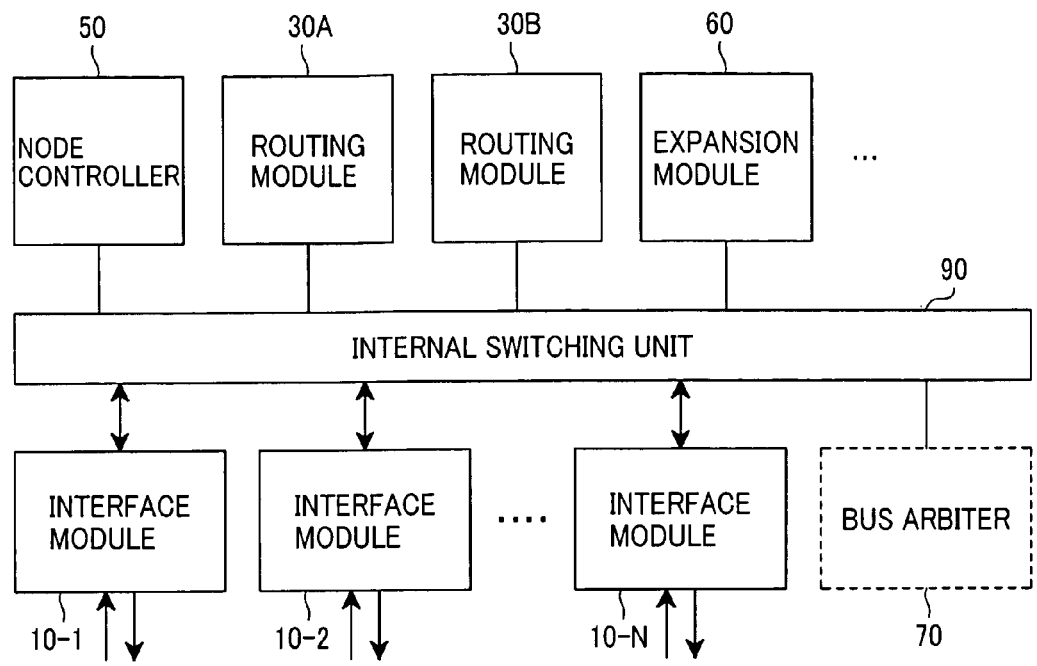
FIG. 1 shows a block diagram of an example of a packet forwarding apparatus according to an embodiment of the present invention.

FIG. 1 shows a block diagram of a packet forwarding apparatus according to an embodiment of the present invention.

The packet forwarding apparatus is comprised of a plurality of interface modules 10 (10-1 to 10-N), each of which is connected to input and output lines of a network, routing modules 30A and 30B, one of which operates as an active routing module and the other of which operates as a standby routing module, a node controller 50 for controlling the packet forwarding apparatus, at least one expansion module 60 for expanding the packet forwarding apparatus functionality, and an internal switching unit 90 for interconnecting these modules.

Each of the interface modules 10 adds an internal header to a packet received from the network and outputs the packet to the internal switching unit 90. The internal header includes internal routing information indicating a destination module to which the packet is forwarded. The internal switching unit 90 forwards the packet received from each of the interface modules 10 to one of the other modules according to the internal routing information.

In the present invention, although there is no limitation to the type of the internal switching unit 90, for example, a bus-type internal switching unit 90 is preferable. According to the bus-type internal switching unit, each of the modules selectively receives a packet from an internal bus according to a module address indicated by the internal header, so that each of the interface modules 10 can forward a routing control packet received from the network to both the routing modules 30A and 30B in parallel, as will be described later. In this case, each of the interface modules 10 can forward a single routing control packet received from the network to both the routing modules 30A and 30B by attaching an internal header having a multicast address shared by the routing modules 30A and 30B to the received packet. If the bus-type internal switching unit 90 is adopted, a bus arbiter 70 indicated by a dotted block controls outputting the packets from each of the modules to the internal switching unit (internal bus) 90.

Figure 2:
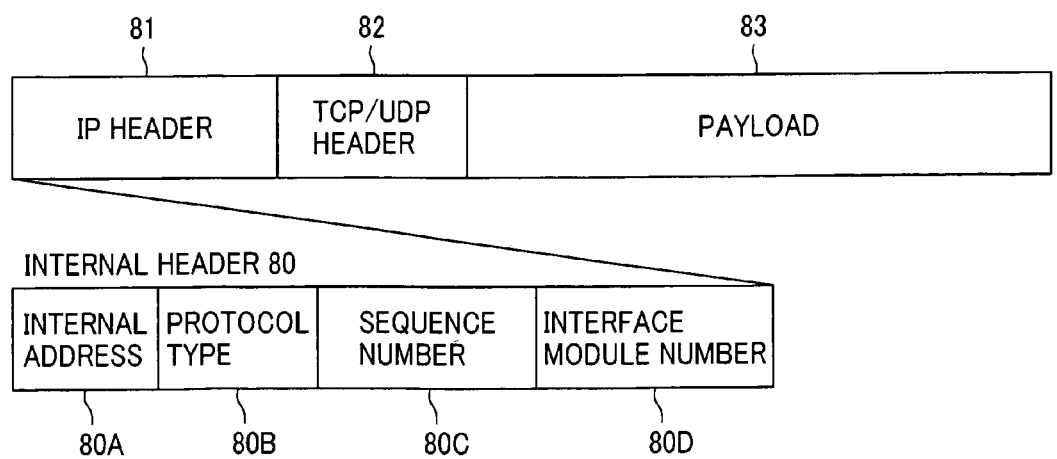
FIG. 2 shows an example of a packet format that is handled by the packet forwarding apparatus.

FIG. 2 shows an example of a packet format that is handled by the packet forwarding apparatus.

A packet that each of the interface modules 10 transmits and receives to/from the network is comprised of an IP header 81, a TCP/UDP header 82, and a payload 83. Upon receiving a packet from the network, each of the interface modules 10 adds an internal header 80 to the head of the IP header 81 and outputs the packet as an internal packet to the internal switching unit 90. In the present embodiment, the internal header 80 includes an internal address 80A to be used as routing information by the internal switching unit 90, protocol type 80B determined from the DCP/UDP header 82, a sequence number 80C specific to each interface module, and an interface module number 80D.

By referring to FIGS. 3 through 5, operations of the routing modules 30A and 30B in the packet forwarding apparatus of the present invention will be described in brief. Here, it is assumed that the routing module 30A is set in active operating mode and the routing module 30B is set in standby operating mode.

Figure 3:
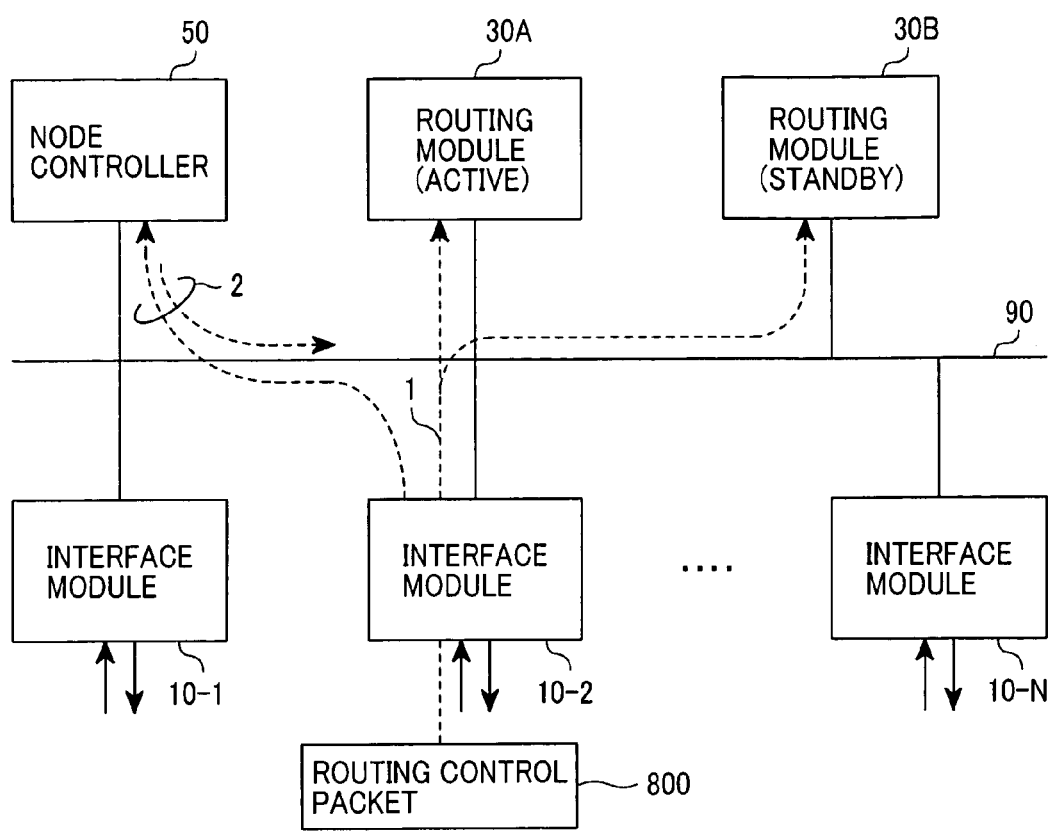
FIG. 3 shows the operation of an interface module when the interface module has received a routing control packet.

FIG. 3 shows operations of an interface module 10-2 when the interface module has received a routing control packet 800 from the network.

When the interface module 10-2 judges that a packet received from the network is a routing control packet 800, it forwards the routing control packet 800 to both the active and standby routing modules 30A and 30B via the internal switching unit 90 as indicated by a dotted arrow 1. However, as indicated by a dotted arrow 2, the routing control packet 800 may be forwarded from the interface module 10-2 to the node controller 50 and the node controller 50 may forward that packet to both the active and standby routing modules 30A, 30B.

Figure 4:
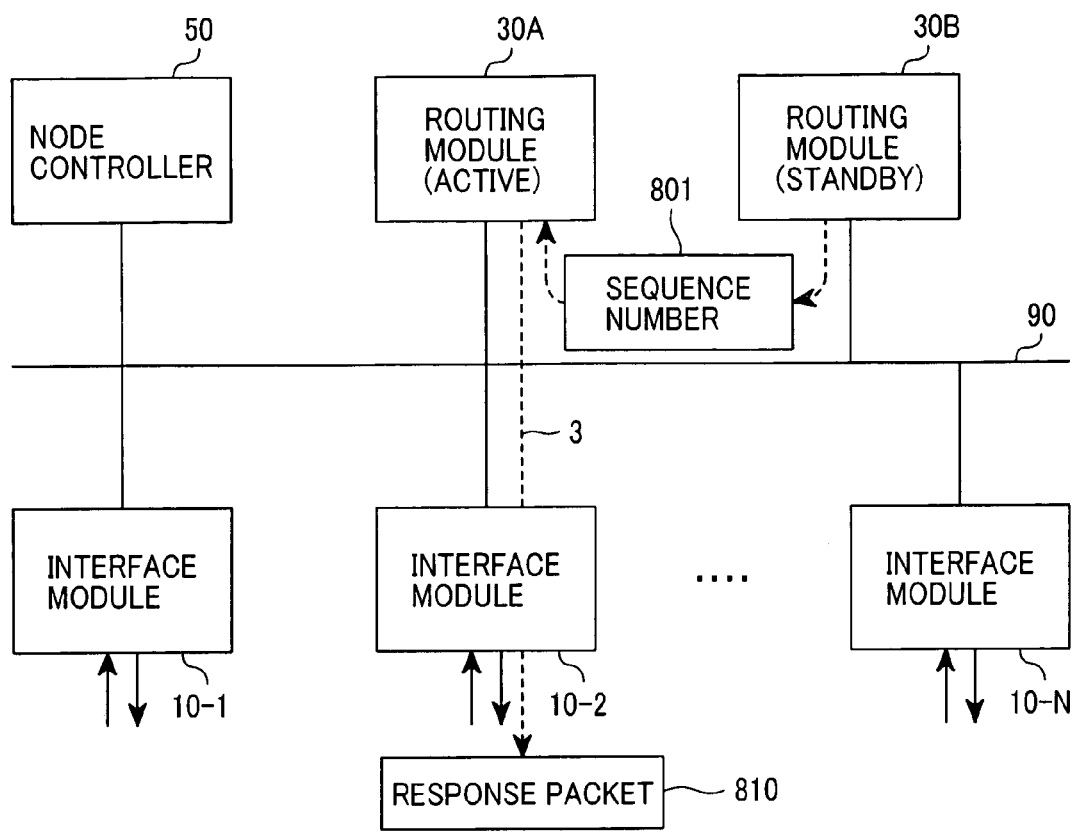
FIG. 4 shows the operation of routing modules when these modules have received a routing control packet.

FIG. 4 shows operations of the routing modules 30A and 30B when these modules have received the routing control packet 800.

Having received the routing control packet 800 transmitted from another node apparatus on the network, each of the routing modules 30A and 30B executes routing control information processing according to a routing protocol prepared therein, and updates its own routing information databases, independently. In the present invention, as indicated by a dotted arrow 3, only the active routing module 30A replies a response packet 810 to the node apparatus that transmitted the routing control packet 800. On the other hand, the standby routing module 30B sends to the active routing module 30A an internal control packet 801 including the sequence number 80C extracted from the internal header of the received routing control packet 800 to notify that it has received the routing control packet 800 and executed predetermined routing control information processing in response to the packet.

Each time receiving a routing control packet 800 from one of the interface modules, each of the active routing module 30A and the standby routing module 30B records the sequence number 80C of the routing control packet 800 having been processed by the module into its own ACK confirmation tables 41 which will be described later. Upon receiving the internal control packet 801 from the standby routing module 30B, the active routing module 30A sends back a response (ACK) to the standby routing module 30B, refers to its ACK confirmation table, and compares the sequence number 80C notified from the standby routing module with the sequence number 80C of the routing control packet processed by the active routing module, thereby to determine whether the standby routing module is normally operating in synchronize with the active routing module. The standby routing module 30B makes sure that the active routing module is in normal operation by receiving the response from the active routing module 30A.

Figure 5:
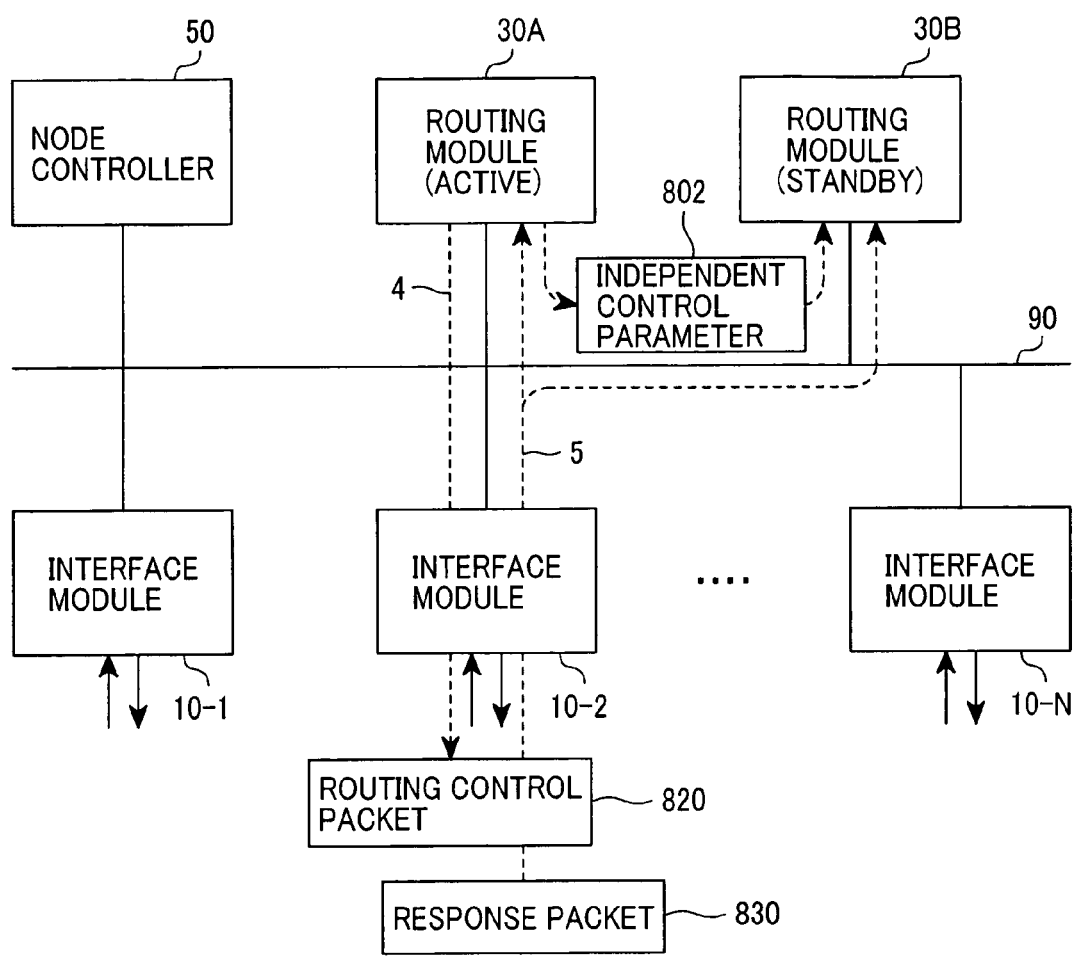
FIG. 5 shows operation of the routing modules when a routing control packet is transmitted from the packet forwarding apparatus of the present invention to another node.

FIG. 5 shows operations of the routing modules 30A and 30B upon occurrence of a predefined event that triggers the transmission of a routing control packet from the packet forwarding apparatus to the other node apparatuses on the network, such as, e.g., detecting a failure and a periodical timer interrupt occurring. In this case, as indicated by a dotted arrow 4, only the active routing module 30A generates a routing control packet 820. When another node apparatus replies a response packet 830 for the routing control packet 820, the interface module 10-2 forwards the response packet to both the active and standby routing modules 30A and 30B in the same way as when receiving the routing control packet 800, as indicated by a dotted arrow 5.

Here, it is assumed that the active routing module 30A has set independent control information (individual control parameter) typified by random information that varies depending on time information provided by a timer, into the routing control packet 820. In this case, another node apparatus replies a response packet 830 including the independent control information specified in the routing control packet 820. Upon receiving the response packet 830, the active routing module 30A compares the independent control information extracted from the response packet 830 with the independent control information that was added to the routing control packet 820 and determines whether the response packet is valid.

On the other hand, as the standby routing module 30B generates independent control information having a value different that of the active routing module, the standby routing module is unable to properly process the response packet 830 including the independent control information generated by the active routing module. Thus, in the present invention, when the routing control packet 820 indicating the value of the independent control information is generated, the active routing module 30A sends an internal control packet 802 including the independent control information to the standby routing module 30B. By replacing the independent control information to be used for processing the response packet 830 with the independent control information notified from the active routing module, the standby routing module 30B can process the response packet 830 properly.

Figure 6:
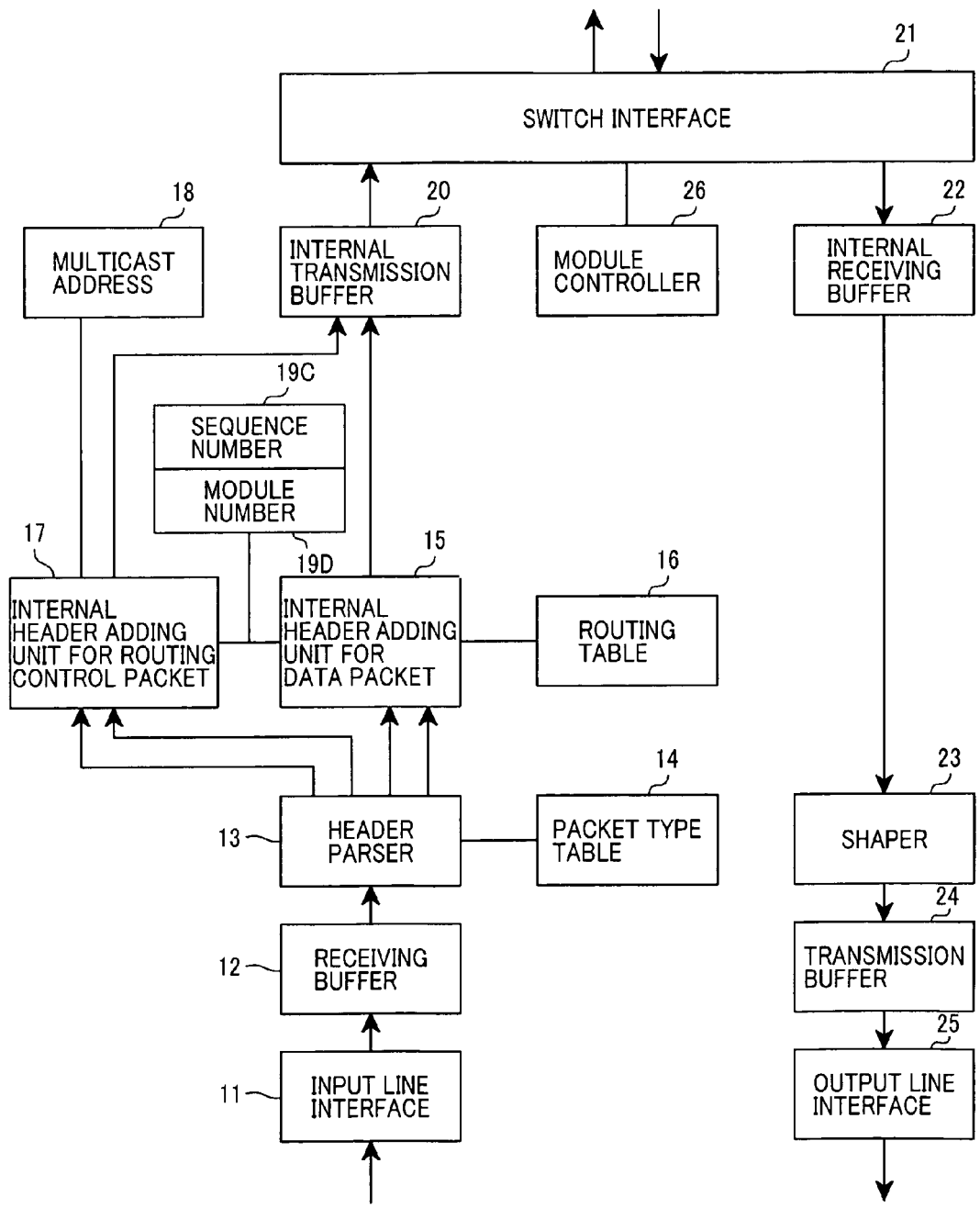
FIG. 6 is a block diagram showing an embodiment of the interface module.

FIG. 6 is a block diagram showing an embodiment of the interface module 10.

The interface module 10 is equipped with an input line interface 11 connected to an input line of the network and carries out termination processing at the OSI layer 2, a receiving buffer 12 for buffering IP packets output from the input line interface 11 temporarily, and a header parser 13 for reading out an IP packet from the receiving buffer 12 and determining whether the received IP packet is a packet to be forwarded to the routing modules 30A and 30B based on the contents of the packet header (IP header 81 and TCP/UDP header 82) and a packet type table 14. Hereinafter, a packet to be forwarded to the routing modules is simply referred to as a routing control packet even if it is a response packet 810.

If the received IP packet is a routing control packet, the header parser 13 outputs the received IP packet to an internal header adding unit 17 for routing control packets and notifies the internal header adding unit 17 of the protocol type of the routing control packet determined from the packet type table 14. If the received packet is not a routing control packet, the header parser 13 outputs the received IP packet to an internal header adding unit 15 for data packets and notifies the internal header adding unit 15 of a destination IP address that is required in a routing table search.

The internal header adding unit 15 for data packets searches a routing table 16 for internal routing information (an internal address) based on the destination IP address, generates an internal header 80 including the internal address as the internal address 80A as well as a sequence number 80C and the interface module number 80D retrieved from register areas 19C and 19D, respectively, adds the internal header to the received IP packet, and outputs that packet in a form of an internal packet to an internal transmission buffer 20. The value of the sequence number stored in the register area 19C is updated each time an internal address is generated. The internal header 80 generated from the internal header adding unit 15 includes an invalid value as the protocol type 80B.

On the other hand, the internal header adding unit 17 for routing control packets generates an internal header 80 indicating a multicast address common to the routing modules 30A and 30B as an internal address 80A, which is retrieved from a register area 18, the protocol type 80B notified from the header parser 13, and the sequence number 80C and the interface module number 80D retrieved from the register areas 19C and 19D, respectively, adds the internal header 80 to the received IP packet, and outputs that packet in a form of the internal packet to the internal transmission buffer 20. The internal header adding unit 17 also updates the value of the sequence number stored in the register area 19C each time an internal address is generated.

The received IP packets stored in the internal transmission buffer 20 are read out by a switch interface 21 and output to the internal switching unit 90. The received IP packet output to the internal switching unit 90 is forwarded to one of the modules connected to the internal switching unit 90 according to the internal address 80A in the internal header 80. In the case of the present embodiment, the routing control packet having the multicast address is forwarded to both the routing modules 30A and 30B, and each of received IP packets other than the routing control packet is forwarded to one of the other interface modules 10, the node controller 50, or an expansion module 60.

Upon receiving a transmission IP packet in an internal packet form output from any other module via the internal switching unit 90, the switch interface 21 outputs the packet to an internal receiving buffer 22. The transmission IP packet stored in the internal receiving buffer 22 is subjected to packet flow shaping by a shaper 23, if necessary, and output to a transmission buffer 24 after removing the internal header. The transmission IP packet in the transmission buffer 24 is read out and transmitted to the network through an output line interface 25.

Updating the packet type table 14 and the routing table 16 and setting the multicast address into the register area 18 are carried out through a module controller 26 provided for each of the interface modules 10.

FIG. 7 shows a structure of the packet type table 14.

The packet type table 14 is comprised of a plurality of table entries 140 (140-1, 140-2, . . . ). Each of the table entries includes a transport protocol 141, a protocol/port number 142, a protocol type 143, and validity 144. The transport protocol 141 indicates the type of TCP/UDP header of a received IP packet and the protocol/port number 142 indicates the destination port number in the TCP/UDP header. The protocol type 143 indicates the type of a routing protocol which is specified by the combination of the transport protocol 141 and the protocol/port number 142. The validity 144 indicates whether the table entry registered in the packet type table is valid for the interface module 10.

In the example shown here, the packet type table 14 defines RIP, BGP, and OSPF as the type of routing protocols and only the RIP entry 140-1 is valid as "1" is set to the validity 144. The header parser 13 shown in FIG. 6 extracts the type of transport protocol and the destination port number from the TCP/UDP header 82 of the received IP packet and refers to the packet type table 14 using the combination of the transport protocol and the destination port number as a search key. As a result, if the received IP packet is judged as a routing control packet for RIP, the header parser 13 outputs the received IP packet to the internal header adding unit 17 for routing control packets. If the search key specified by the type transport protocol and the destination port number of the received IP packet does not match with any of the entries in the packet type table 14, the header parser 13 outputs the received IP packet to the internal header adding unit 15 for data packets.

Even when the type of transport layer and the destination port number of TCP/UDP header match with the transport protocol 141 and the protocol/port number 142 of one of the table entry in the packet type table 14, the received IP packet is not forwarded to the internal header adding unit 17 for routing control packets if the validity 144 of the table entry is "0".

Figure 8:
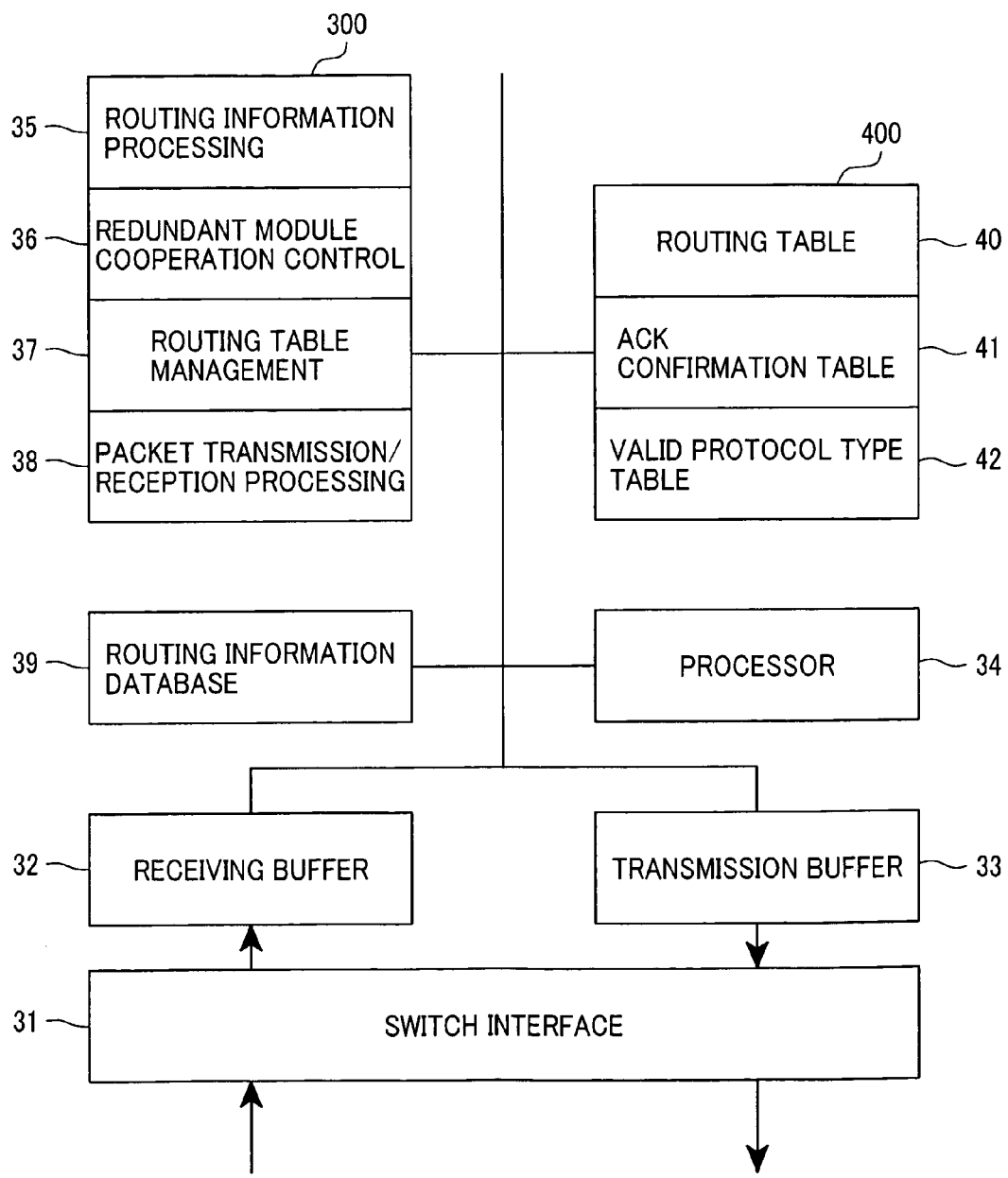
FIG. 8 is a block diagram showing an embodiment of the routing module.

FIG. 8 is a block diagram showing an embodiment of the routing module 30 (30A, 30B).

The routing module 30 is equipped with a switch interface 31 for connecting to the internal switching unit 90, a receiving buffer 32 and a transmission buffer 33 connected to the switch interface 31, and a processor 34. As software relevant to the present invention and to be executed by the processor 34, a routing information processing routine 35, a redundant module cooperation control routine 36, a routing table management routine 37, and a packet transmission/reception processing routine 38 are prepared in a memory 300. During the execution of these software routines, the processor 34 refers to or updates a routing information database 39 and a routing table 40, an ACK confirmation table 41, and a valid protocol type table 42 prepared in a memory 400.

FIG. 9 is a functional block diagram showing mutual relationships of the software routines 35 to 38, the database 39, and the tables 40 to 42 shown in FIG. 8.

The packet transmission/reception processing routine 38 performs reading out a received packet from the receiving buffer 32, judging the received packet according to the valid protocol type table 42, and outputting a transmission packet to the transmission buffer 33. The valid protocol type table 42 specifies the routing protocol type for which each of the routing modules 30A and 30B is authorized to deal with.

The packet transmission/reception processing routine 38 discards the received packet unless the routing protocol type of the received packet is authorized in the valid protocol type table 42. If the received packet is an authorized routing control packet transmitted from another node apparatus on the network, the routing control information processing routine 35 is executed. If the received packet is an internal control packet to be communicated between the routing modules, the redundant module cooperation control routine 36 is executed.

The redundant module cooperation control routine 36 confirms a synchronization state between the active routing module 30A and the standby routing module 30B by using the ACK confirmation table 41, and switches the operation mode of the active routing module 30A and the standby routing module 30B when a failure is detected in the active routing module 30A. The routing control information processing routine 35 refers to or updates a routing control information file 391, neighbor node information file 392, and interface module information file 393 prepared in the routing information database 39 during the execution of routing control information processing and carries out communication of routing control packets with the other node apparatuses on the network.

The routing table management routine 37 updates the routing table 40 by using information stored in the routing information database 39, and sends a control packet to update the contents of the routing table 16 to the module controller 26 on each of the interface modules 10, if necessary.

Although the routing control information processing routine 35 and the redundant module cooperation control routine 36 are treated here as individual routines, a part or all of the redundant module cooperation control routine 36 may be integrated into the routing control information processing routine 35 in practical application because these two routines are closely related with each other as will be described later, whereby internal control packets to be communicated between the routing modules are processed by the routing control information processing routine 35.

FIG. 10 shows an embodiment of the ACK confirmation table 41 for use in the redundant module cooperation control routine 36.

The ACK confirmation table 41 is comprised of table entries 410-1, 410-2 corresponding to the active routing module and the standby routing module. Each of table entries indicates a module address 411 as a module identifier, operation mode 412, a sequence number 413, and synchronization state 414. The module address 411 corresponds to the destination address of an internal control packet 801 or 802 including a sequence number and independent control information described by referring to FIGS. 4 and 5. The mode 412 indicates the standby mode or the active mode in which the routing module identified by the module address 411 is operating.

In the ACK confirmation table 41 provided for the active routing module, the sequence number 413 of entry 410-1 for the active routing module indicates the value of the sequence number 80C extracted from the internal header of a routing control packet 800. The sequence number 413 of the entry 410-2 for the standby routing module indicates the value of the sequence number notified with an internal control packet 801. In the ACK confirmation table 41 provided for the standby routing module, the value of the sequence number 80C extracted from the internal header of a routing control packet 800 is stored as the sequence number 413 of the entry 410-2 for the standby routing module and the sequence number 413 of the entry 410-1 for the active routing module is undefined.

The synchronization state 414 indicates whether the active module and standby modules are in synchronization. In other words, this field indicates whether each of the routing modules is operating normally. In the ACK confirmation table 41 provided for the active routing module, the sequence number 413 in the entry 410-2 for the standby routing module is updated somewhat later than the sequence number in the entry 410-1 for the active routing module. Accordingly, when the sequence number of the standby module becomes matching with the sequence number of the active module within a predetermined time period, it is judged that the active and standby modules are operating in synchronization (SYNC) with each other.

Figure 11:
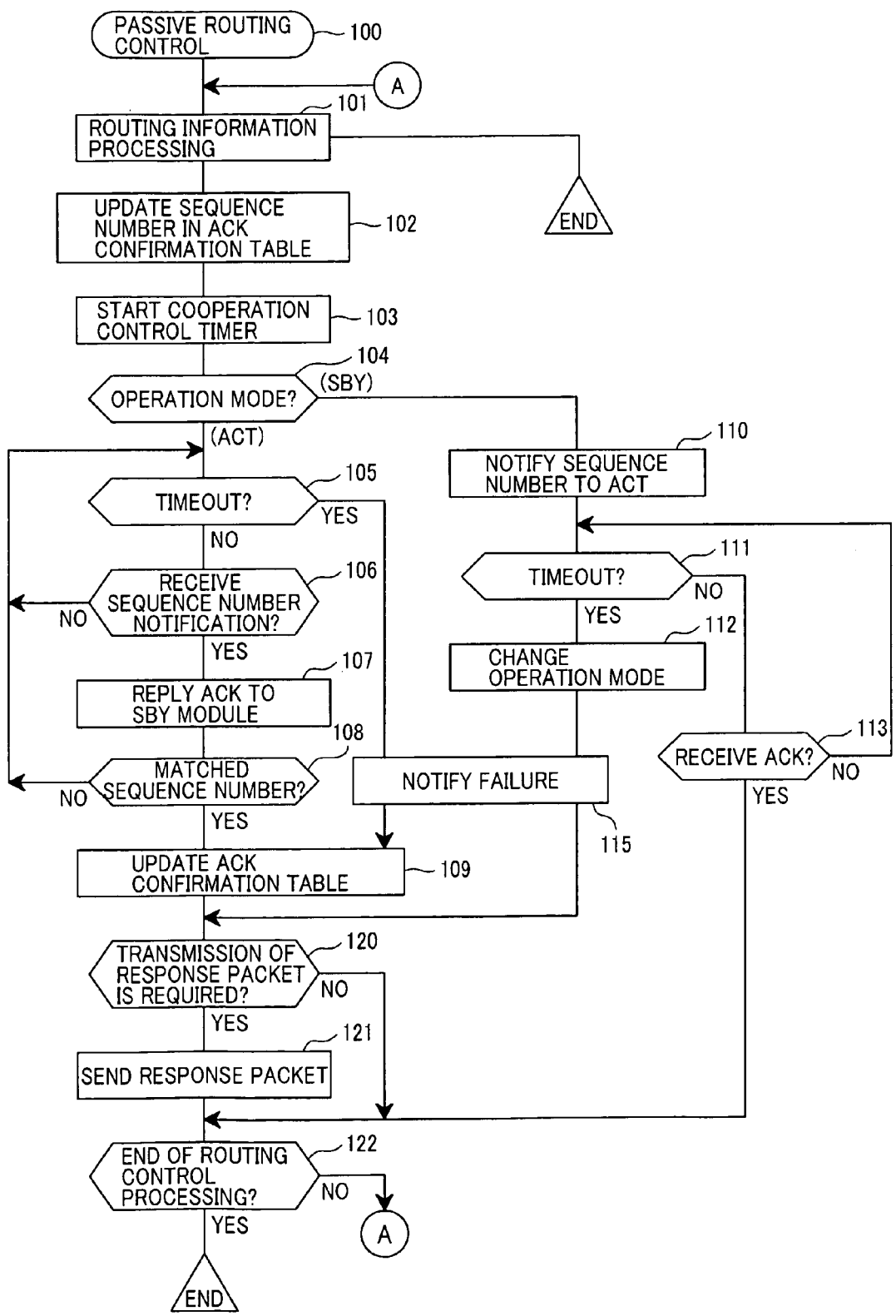
FIG. 11 is a flowchart illustrating one embodiment of a routing control information processing routine to be executed by each of the routing modules when receiving a routing control packet.

FIG. 11 shows a flowchart of a passive routing control procedure 100 to be executed by the processor 34 of each of the routing modules 30A and 30B upon receiving a routing control packet 800 from another node apparatus.

In the passive routing control procedure 100, routing information processing corresponding to the contents of the routing control packet is executed (step 101) according to the routing control information processing routine 35, and the sequence number 413 in the ACK confirmation table 41 is updated (102) according to the sequence number 80C specified in the internal header of the routing control packet. Each of the routing modules updates its relevant sequence number associated with its module address 411. That is, the active routing module 30A updates the sequence number 413 in the record 410-2 for the active routing module and the standby routing module 30B updates the sequence number 413 in the record 410-2 for the standby routing module.

Next, the processor 34 starts a cooperation control timer to measure time period T allowed for waiting for a response from the other routing module (103) and checks its operation mode (104) in the ACK confirmation table. If the operation mode 412 indicates standby in the ACK confirmation table 41, the standby routing module sends a notification packet (internal control packet) of the sequence number 413 to the active routing module specified in the ACK confirmation table 41 (110) and waits for receiving a response (ACK) packet from the active routing module (113). If the standby routing module receives the response packet before timeout of the cooperation control timer, step 122 is executed.

If the cooperation control timer times out (111) without receiving any ACK packet, the processor 34 (the standby routing nodule) judges that an active routing module failure occurs. In this case, the standby routing nodule executes switching of the operation mode in the ACK confirmation table 41 (112), notifies the node controller 50 of the active routing module failure (115), and executes step 120. The switching of the operation mode involves changing the operation mode 412 of the entry 410-1 for the active routing module to standby and changing the operation mode 412 of the entry 410-2 for the standby routing module to active. At this time, in the entry 410-1 for the routing module 410-1 changed from active to standby mode, the synchronization state 414 is changed to "async."

In step 104, if the operation mode indicates active, the processor 34 (the active routing module) checks the cooperation control timer (105). If the timer does not time out, the active routing module waits for receiving a sequence number notification from the standby routing module (106). When receiving the sequence number notification before the cooperation control timer times out, the active routing module sends an ACK packet back to the standby routing module (107), and checks whether the notified sequence number matches with the sequence number 413 stored in the entry 410-1 for the active routing module in the ACK confirmation table 41 (108). If a mismatch occurs between the sequence numbers, the program sequence returns to step 105.

If the sequence numbers match to each other, the sequence number 413 of the entry 410-2 for the standby routing module in the ACK confirmation table 41 is updated (109) and step 120 is executed. When the allowed time period T has passed and the cooperation control timer times out without receiving the sequence number notification, the active routing module notifies the node controller 50 of the standby routing module failure (115). After that, the active routing module sets (109) "async" to the synchronization state 414 of the entry for the standby module in the ACK confirmation table 410 and executes step 120. Upon receiving the notification of the routing module failure, the node controller 50 sends a notification message of the routing module failure to a system administration apparatus designated previously.

In step 120, it is determined whether transmission of a routing control response packet is necessary. If there exist a response packet to be sent, the active routing module sends the response packet (121) and executes step 122. In the step 122, it is determined whether the routing control procedure is completed (122). If not, the program sequence returns to step 101 and the routing information processing is repeated until a series of control steps are completed.

Figure 12:
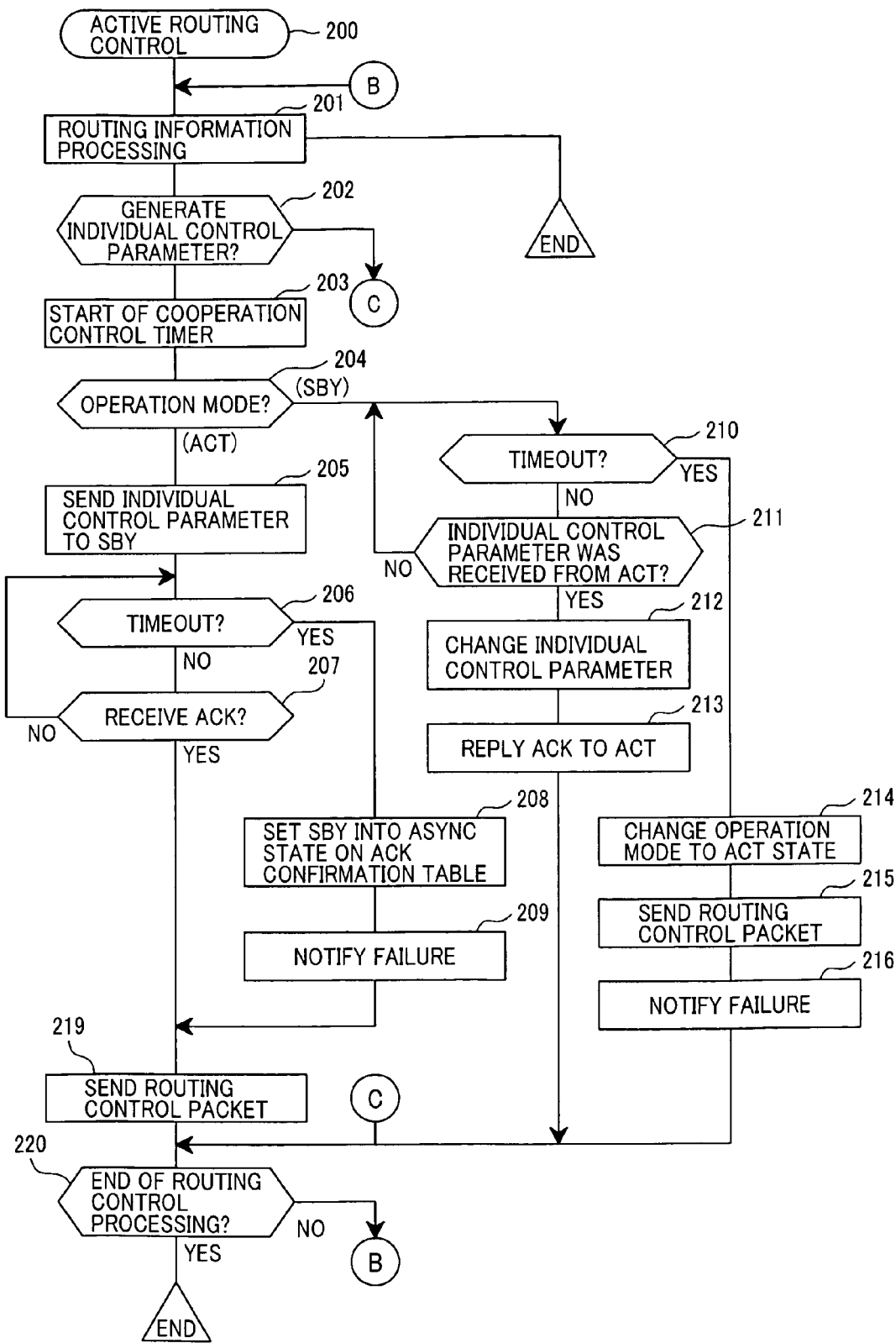
FIG. 12 is a flowchart illustrating another embodiment of a routing control information processing routine that is executed on each routing module when transmitting a routing control packet.

FIG. 12 shows a flowchart of an active routing control procedure 200 to be executed by each of the routing modules 30A and 30B when an event triggering the transmission of a routing control packet from the packet forwarding apparatus occurs.

In the active routing control procedure 200, routing information processing appropriate for the event is executed (201). If independent control information (individual control parameter) is generated (202), the processor 34 starts the cooperation control timer (203) and checks its operation mode (204). If the operation mode is set active, the processor 34 (the active routing module) sends (205) an internal control packet indicating the independent control information to the standby routing module specified in the ACK confirmation table 41 and waits for receiving an ACK packet from the standby routing module (207). When receiving the ACK packet before the cooperation control timer times out, the active routing module transmits a routing control packet including the independent control information to the other node apparatuses on the network (219). After that, the active routing module determines whether the routing control procedure is completed. If not, the program sequence returns to step 201 and the routing information processing is repeated until a series of control steps are completed.

If the cooperation control timer times out (206) without receiving the ACK packet from the standby routing module, the active routing module sets "async" to the synchronization state 414 of the entry for the standby routing module in the ACK confirmation table 41 (208), notifies the node controller 50 of the standby routing module failure (209), and executes step 219 and subsequent sequence.

If the operation mode is set standby in step 204, the processor 34 (the standby routing module) waits for receiving an internal control packet indicating independent control information from the active routing module (211). When receiving the internal control packet before the cooperation control timer times out, the standby routing module replaces the independent control information generated by itself with the independent control information specified in the internal control packet (212), returns an ACK packet to the active routing module (213) and executes step 220.

If the cooperation control timer times out without receiving the internal control packet indicating the independent control information (210), the processor 34 (the standby routing module) judges that a failure occurs in the active routing module. Then, the standby routing module switches over (214) the operation modes of the entries for the active routing module and the entry for the standby routing module in the ACK confirmation table 41, transmits a routing control packet including the independent control information generated by itself to the other node apparatuses on the network (215), notifies the node controller 50 of the active routing module failure (216), and executes step 220.

As apparent from the above embodiment, according to the present invention, the active routing module exchanges routing control packets with the other node apparatuses on the network as a representative of the packet forwarding apparatus, whereas the active and standby routing modules carry out routing control information processing in parallel and update their routing information databases in synchronization with each other in the packet forwarding apparatus. Therefore, when a failure occurs in the active routing module, the standby routing module having detected the failure and switched to the active mode can take over the routing control information processing immediately as a new active routing module.

In the foregoing embodiment, each of the interface modules 10 determines whether an IP packet received from the network is a routing control packet and, when receiving a routing control packet, the interface module forwards the routing control packet to both the active and standby routing modules by adding an internal header having a multicast address common to the active and standby routing modules to the received packet.

However, as indicated by the dotted arrow 2 in FIG. 3, it is also possible to take an alternative manner in which each interface module 10 forwards the routing control packet received from the network to the node controller 50 and the node controller forwards the routing control packet to both the active and standby routing modules 30A and 30B by. In this case, since each of the interface modules 10 can simply process all received packets through the internal header adding unit 15 without discriminating the packet type, it is able to simplify the module configuration and speed up the interface module operation.

In the latter case, the packet type table 14 may be provided for the node controller 50, so that the processor of the node controller 50 can determine whether a received packet is a routing control packet that the node can serve. For such a routing control packet, the node controller adds an internal header having a multicast address common to the active and standby routing modules 30A and 30B to the received packet and outputs the packet to the internal switching unit 90. The function of forwarding such a routing control packet may be provided in the expansion module 60 instead of the node controller 50.

Figure 13:
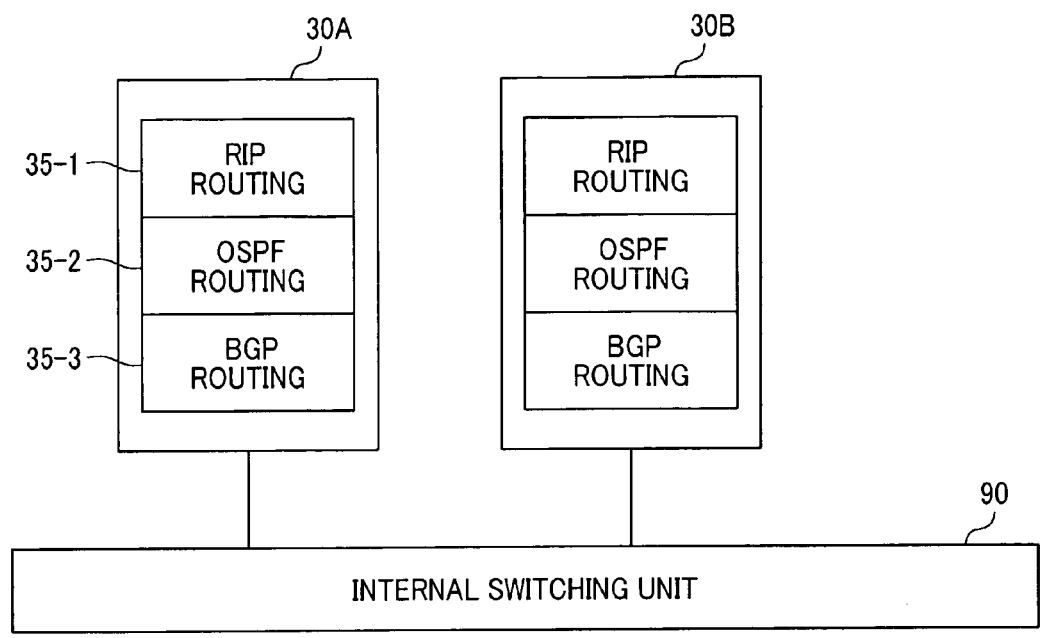
FIG. 13 shows another embodiment of the packet forwarding apparatus according to the present invention.

FIG. 13 shows another embodiment of the present invention. In this embodiment, each of the active and standby routing modules 30A and 30B is provided beforehand with a plurality of routing control information processing routines 35 (35-1, 35-2, 35-3, . . . ) for different protocols, one of which is specified as a valid protocol for the routing module in the valid protocol type table. By providing a plurality of multiple routing control information processing functions beforehand as in this embodiment, the same packet forwarding apparatus can be applicable to networks running different protocols. This embodiment is also applicable to a connection node for connecting a plurality of networks running different routing protocols.

Figures 14, 15:
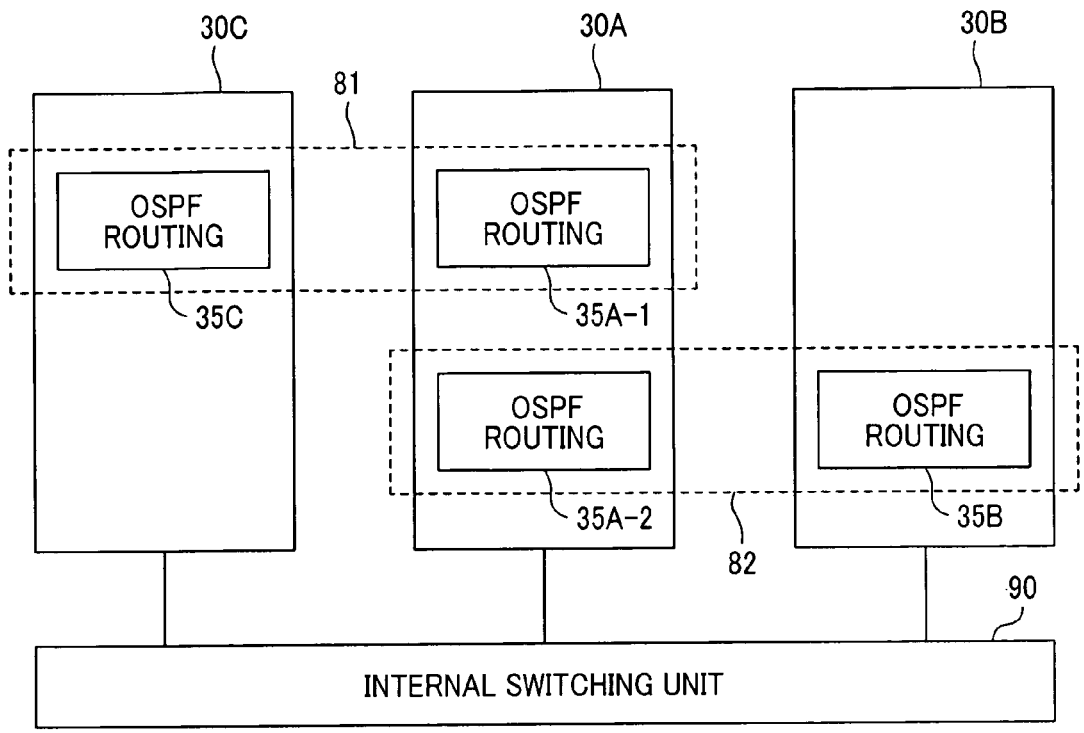
FIG. 14 shows still another embodiment of the packet forwarding apparatus according to the present invention.
FIG. 15 shows an example of a VPN discrimination table applied to the embodiment of FIG. 14.

FIG. 14 shows, as still another embodiment of the present invention, a packet forwarding apparatus capable of realizing a plurality of virtual routers on routing modules 30. A virtual router termed here denotes to make a single packet forwarding apparatus operable as a plurality of packet forwarding entities (virtual routers), each of which can independently communicate with another node apparatus on the network, by running a plurality of routing functions under a same protocol in parallel on the packet forwarding apparatus. The virtual routers in this embodiment are technically different from a Virtual Router Redundancy Protocol (VRRP) which regards a plurality of routers as a single virtual router.

FIG. 14 shows an example where OSPF is applied as a routing protocol and the packet forwarding apparatus is equipped with three routing modules 30A, 30B and 30C connected to the internal switching unit 90. Two OSPF routing functions 35A-1 and 35A-2 run on the routing module 30A and individual OSPF routing functions 35B and 35C run on the routing modules 30B and 30C, respectively. Each OSPF routing function corresponds to the routines 35 to 37 shown in FIG. 8 and is provided with a routing information database 39 and tables 40 to 42.

In the example shown, as indicated by dotted blocks, the OSPF routing functions 35A-1 and 35C cooperate with each other as a first redundant virtual routing entity 81 and the OSPF routing functions 35A-2 and 35B cooperate with each other as a second redundant virtual routing entity 82. The first and second virtual routing control entities 81 and 82 correspond to, e.g., first and second virtual private networks (VPNs) formed on the same network, respectively. The first virtual routing entity 81 executes routing control information processing for the first VPN, and the second virtual routing entity 82 executes routing control information processing for the second VPN. In the first virtual routing entity 81, one of the OSPF routing functions 35A-1 and 35C is active and the other is standby. In the second virtual routing entity 82, one of the OSPF routing functions 35A-2 and 35B is active and the other is standby. The active and standby operations are the same as explained in conjunction with FIGS. 11 and 12.

In the case of this embodiment, for each routing control packet, it is required to discriminate VPN to which the packet belongs so that the first virtual routing entity 81 can accept only the routing control packets from the first VPN and the second virtual routing entity 82 can accept the routing control packets from the second VPN. VPN can be identified by the combination of a line number (interface module number) and header information of the received packet, such as VLAN tag of IEEE 802.1q and VPI/VCI specified in an ATM cell header. Therefore, to identify VPN to which a routing control packet belongs, for example, a VPN discrimination table 28 for defining the relation between VPN discrimination condition 281 and a virtual routing entity identifier (VPN identifier) 282, as shown in FIG. 15, is used.

Figure 16:
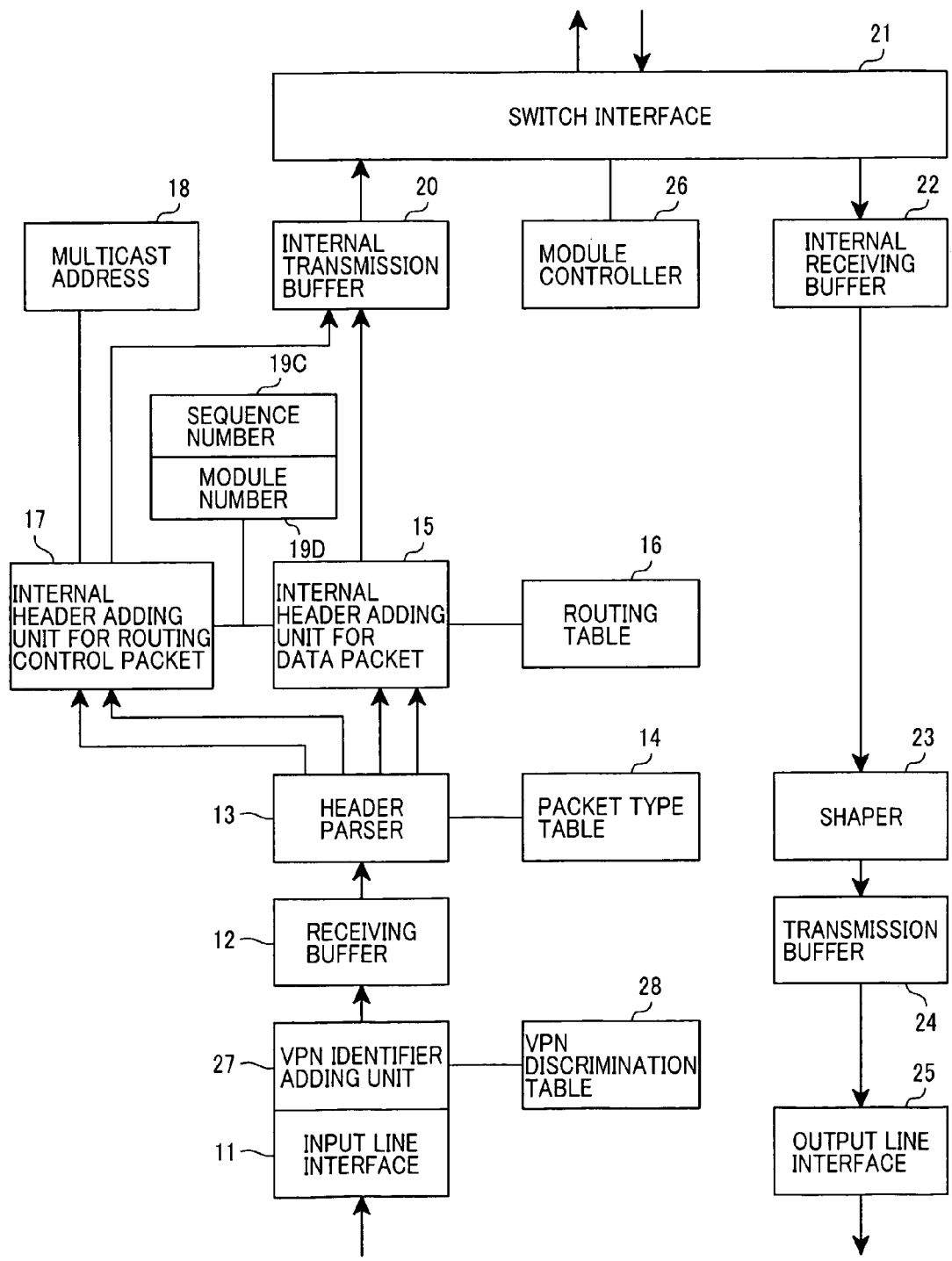
FIG. 16 shows another embodiment of an interface module applicable to the embodiment of FIG. 14.

FIG. 16 shows an embodiment of an interface module 10 modified to discriminate VPN to which a received packet belongs by referring to the VPN discrimination table 28.

In the interface module 10 shown here, the input line interface 11 shown in FIG. 6 is equipped with a VPN identifier adding unit 27. The VPN identifier adding unit 27 refers to the VPN discrimination table 28 and adds an internal header including an appropriate VPN identifier to each of the received packets.

For example, if an ATM network is connected to the interface module 10, the input line interface 11 assembles received ATM cells into a variable length packet, and the output line interface 25 converts a variable length packet to ATM cells. After a variable length packet (IP packet) is constructed at the input line interface 11, the VPN identifier adding unit 27 refers to the VPN discrimination table 28. If VPI/VCI of the variable length packet matches the VPN discrimination condition 281 of one of table entries, the VPN identifier adding unit 27 adds an internal header having a VPN identifier 282 corresponding to the appropriate virtual routing entity to the packet and outputs the variable length packet to the receiving buffer 12. If the VPI/VCI does not match any VPN discrimination condition 281, the VPN identifier adding unit 27 adds an internal header with a given length of a predetermined bit pattern, e.g., a pattern of all "1" bits, to the packet and outputs the variable length packet to the receiving buffer 12.

If the interface module 10 is connected, for example, to a line for carrying a labeled packet as in an MPLS network, the VPN identifier adding unit 27 refers to the VPN discrimination table 28 to determine whether the label information attached to the received packet matches the VPN discrimination condition 281, and, if so, adds an internal header as above.

In this embodiment, the VPN identifier is added, by the VPN identifier adding unit 27, to the internal header 80 shown in FIG. 2 as an internal header information item following the interface module number 80D. The received packet output to the internal switching unit 90 is forwarded to the routing modules 30A to 30C if it is a routing control packet. Otherwise, the packet is forwarded to one of the other interface modules, the node controller 50 or the expansion module 60.

When each of the routing modules 30A to 30C receives a routing control packet via the internal switching unit 90, the packet transmission/reception processing routine 38 shown in FIG. 9 refers to the valid protocol type table 42 to check the validity of the protocol type 80B indicated in the internal header 80. For a routing control packet of a protocol type that the module can accept, the packet transmission/reception processing routine 38 passes the routing control packet to the virtual routing entity (routing control information processing routing 35) identified by the VPN identifier in the internal header 80, whereby processing of routing control information for VPNs can be implemented by the virtual routers.

Although the redundant configuration including one standby routing module was discussed in the forgoing embodiments, the packet forwarding apparatus may be equipped with two or more standby routing modules to enhance system security. In this case, the standby routing modules are ordered by priority. When a failure occurs in the active routing module, the highest priority one of standby routing modules in a normal state switches to active mode. The ordering of priority may be in young order of the module addresses stored in the ACK confirmation table 41.

In the case where the packet forwarding apparatus includes a plurality of standby routing modules, multicast addressing common to these routing modules may be applied as an address of an internal control packet to be communicated among the routing modules, so that an internal control packet sent from the active routing module can be received by all standby routing modules and an internal control packet sent from one of the standby routing modules can be received by all other modules. Since each of the standby routing modules can receive a sequence number notification or a response to an independent control information notification packet, each of which is transmitted from another standby routing module to the active routing module, and judge the synchronization states of all other routing modules from the ACK confirmation table 41, each module can determine whether it should switch the operation mode to active upon the failure of an active routing module even if a plurality of standby routing modules exist.

Although the foregoing embodiments forward the same routing control packet to both the active and standby routing modules in parallel by applying a multicast address to the packet, each interface module may create a copy of a routing control packet received and send packets having the respective addresses of the active routing module and standby routing module one after another. Alternatively, the copy of a routing control packet may be created in the internal switching unit.

What is claimed is:

1. A packet forwarding apparatus provided with a function to communicate routing control information with another node apparatus on a communication network according to a specific routing protocol, said packet forwarding apparatus comprising:

a plurality of interface modules, each of which is connected to input and output lines of the communication network;

at least two routing modules capable of switching their operation modes between active and standby modes, one of which operates as an active routing module, while the remaining operating as standby; and an internal switching unit for exchanging packets among said interface modules and said routing modules, wherein each of said interface modules has means for forwarding a routing control packet received from the communication network to both said active and standby routing modules, said routing module operating as standby has means for executing routing control information processing in accordance with said routing protocol in response to receiving said routing control packet, and means for sending an internal control packet including identification information of said routing control packet to said active routing module, and said routing module operating as the active has means for executing routing control information processing in accordance with said routing protocol in response to receiving said routing control packet and transmitting a response packet to a sender of the routing control packet, and means for determining a state of said standby routing module depending on whether the internal control packet has been received and its contents.

2. The packet forwarding apparatus according to claim 1, wherein each of said interface modules comprises:

means for determining whether a received packet is a routing control packet or a response packet for routing control compliant with said specific protocol based on header information of the packet received from the communication network;

first internal header adding means for attaching an internal header to the routing control packet or the response packet, the internal header including an internal multicast address assigned to said active and standby routing modules;

second internal header adding means for attaching an internal header to a received packet that is neither the routing control packet nor the response packet, the internal header including an internal address corresponding to a destination address of the received packet; and means for forwarding the packets output from said first and second internal header adding means to said internal switching unit.

3. The packet forwarding apparatus according to claim 1, wherein
- each of said interface modules has means for adding a sequence number specific to the interface module to said routing control packet, and
- said routing module operating as the standby uses the sequence number as said identification information of the routing control packet.

4. The packet forwarding apparatus according to claim 1, wherein
- each of said routing modules is provided with a table for storing operation mode and identification information of the latest routing control packet in association with identifiers of the routing modules connected to said internal switching unit, and
- each time receiving a routing control packet, the routing module operating as active stores the identification information of the routing control packet into said table and determines the state of the standby routing module depending on whether the internal control packet has been received from the standby routing module within a predetermined time period after receiving the control packet and relation between the identification information of the routing control packet specified in the internal control packet received and the identification information of the latest routing control packet that the active routing module received.

5. The packet forwarding apparatus according to claim 1, wherein
- the routing module operating as the active has means for sending a response packet to the sender of said internal control packet in response to receiving the internal control packet, and
- the routing module operating as the standby is provided with means for switching its operation mode to active and the active routing module to standby when it has failed to receive the response packet from the active routing module within a predetermined time period after sending the internal control packet.

6. The packet forwarding apparatus according to claim 1, wherein
- the routing module operating as the active has means for executing routing control information processing in accordance with said routing protocol and transmitting a routing control packet to another node apparatus on the communication network upon occurrence of a predefined event, and means for sending an internal control packet including independent control information applied to the routing control packet to said standby routing module, and
- the routing module operating as standby has means for executing routing control information processing in accordance with said routing protocol upon occurrence of a predefined event, and means for replacing independent control information generated by itself with the independent control information specified in the internal control packet received from the active routing module, thereby to process, when receiving a response packet from another node apparatus on the communication network, the response packet by applying the independent control information replaced.

7. The packet forwarding apparatus according to claim 6, wherein
- the routing module operating as the standby has means for switching its operation mode to active and the active routing module to standby when it has failed to receive the internal control packet having said independent control information from said active routing module within a predetermined time period after executing said routing control information processing upon occurrence of a predefined event.

8. The packet forwarding apparatus according to claim 1, wherein
- one of said routing modules includes a plurality of routing control processing routines to be executed by a processor and constitutes at least two redundant virtual routing control entities by associating each of said routing control processing routines with a routing control routine to be executed by a processor on another routing module,
- each of said interface modules has means for adding to a routing control packet received from the communication network an identifier of a virtual network to which the routing control packet belongs, and
- each of said routing modules executes routing control information processing in response to receiving the routing control packet by using routing control processing routine constituting the virtual routing control, entity corresponding to the virtual network identifier.

9. A packet forwarding apparatus provided with a function to communicate routing control information with another node apparatus on a communication network according to a specific protocol, said packet forwarding apparatus comprising:
- a plurality of interface modules, each of which is connected to input and output lines of a communication network;
- at least two routing modules capable of switching their operation modes between active and standby modes, one of which operates as an active routing module, while the remaining operating as standby;
- a node controller; and
- an internal switching unit for exchanging packets among said interface modules, said node controller and said routing modules, wherein
- each of said interface modules has means for forwarding a routing control packet received from the communication network to said node controller,
- said node controller has means for forwarding the routing control packet to both said active and standby routing modules
- said routing module operating as standby has means for executing routing control information processing in accordance with said protocol in response to receiving said routing control packet, and means for sending an internal control packet including identification information of said routing control packet to said active routing module, and
- said routing module operating as the active has means for executing routing control information processing in accordance with said protocol in response to receiving said routing control packet and returning a response packet to a sender of said routing control packet, and means for determining a state of said standby routing module depending on whether the internal control packet has been received and its contents.

* * * * *